United States Patent [19]

Doumit

[11] 4,199,781
[45] Apr. 22, 1980

[54] PROGRAM SCHEDULE DISPLAYING SYSTEM

[75] Inventor: Joseph A. Doumit, New Iberia, La.

[73] Assignee: Dial-A-Channel, Inc., New Iberia, La.

[21] Appl. No.: 683,954

[22] Filed: May 6, 1976

Related U.S. Application Data

[63] Continuation-in-part of Ser. No. 499,019, Aug. 20, 1974, Pat. No. 3,956,579.

[51] Int. Cl.² ............................................... H04N 7/00
[52] U.S. Cl. .................................... 358/83; 358/130; 358/185; 358/214
[58] Field of Search ................. 358/83, 93, 185, 130, 358/214

[56] References Cited

U.S. PATENT DOCUMENTS

2,656,412  10/1953  Hammond, Jr. .................... 358/294

*Primary Examiner*—Richard Murray
*Attorney, Agent, or Firm*—Clarence A. O'Brien; Harvey B. Jacobson

[57] ABSTRACT

Program schedule information recorded on film is converted into video signals by two video record players for transmission with audio signals through a selected channel to cable television subscribers. The film is incrementally advanced in reverse directions for alternate display of different information recorded on separate frames of the film under control of a sequence controller operating through relays to effect synchronized operation of the video and audio tape players.

12 Claims, 8 Drawing Figures

Program Unit 12

Commercial Unit 14

PROGRAM SCHEDULE DISPLAYING SYSTEM

BACKGROUND OF THE INVENTION

Field of the Invention

This invention relates to the display of program schedule information to be transmitted to public viewers through a selected television channel and is an improvement over the invention disclosed in my prior co-pending application U.S. Ser. No. 499,019, filed Aug. 20, 1974, now U.S. Pat. No. 3,956,579, with respect to which the present application is a continuation-in-part.

In my prior co-pending application aforementioned, the disclosure of which is herein incorporated, a system for displaying program schedule information is disclosed wherein program schedules are recorded on optical film that is incrementally advanced in opposite directions to alternately display different program schedule information. The recorded information is projected from two different optical projectors in order to form a composite image that is picked up by a television camera for conversion into a composite video signal utilized to modulate the output of a television transmitter. Movement of the film and slides of the projectors is synchronized with operation of an audio tape player from which audio signals are derived and combined with the video signals being transmitted by the transmitter. In this fashion, a television viewer after switching the television receiver to a predetermined program schedule channel, may view the program schedule information. The program schedule displayed alternates between the programs in progress and those scheduled for the next program time period. Each half hour the program schedule information is updated. Also, during the time interval that the schedule information is being changed, advertising commercial material is displayed.

Some of the drawbacks associated with the equipment disclosed in my prior co-pending application aforementioned, included high cost of the apparatus, poor resolution of the composite picture produced and the limitations on the information and material capable of being displayed. It is, therefore, an important object of the present invention to provide equipment for carrying out the basic objectives and purposes of the system disclosed in my prior co-pending application in an improved fashion.

SUMMARY OF THE INVENTION

In accordance with the present invention, program schedule information as well as commercial advertising information is recorded as images on film from which video signals are derived through a pair of video record players without image projection and without use of a separate television camera. The video record players utilized are of a commercially available type with which two film frame channels are associated to thereby enlarge the amount of program scheduling information and commercial advertising material that may be handled. Operation of the film transport mechanism of the video record players is modified in order to obtain movement of the film in opposite directions, one frame at a time, in one of the video record players in order to alternately display different program scheduling information while movement of the film in the other of the video record players is reversed after the information recorded on one frame channel is exhausted, so that additional information on the other frame channel may be displayed. Conventional audio tape players are operated in synchronized relationship to each of the video record players in order to produce corresponding audio message signals combined with the video signals to feed a composite signal to the transmitter. Incremental movement of the film in each of the video record players is effected by a reversing drive arrangement operating through a self-locking gear associated with the film transport mechanism to advance the film one frame at a time in opposite directions. The reversing drive component is operated in synchronized relationship to a frame channel changer component. Precise stopping of the film is controlled by synchronizing signals recorded on the film itself between the frames. Plural track, audio tape players are utilized and operation thereof coordinated with that of the video record players through track changer and stop-start components. Synchronized operation of the audio tape players is effected by means of signal tones recorded on one of the tracks of the audio tape for that purpose. A motor driven sequence controller associated with the system effects display of different program schedule and commercial information in a cyclically repeating sequence with periodic updating of the information.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
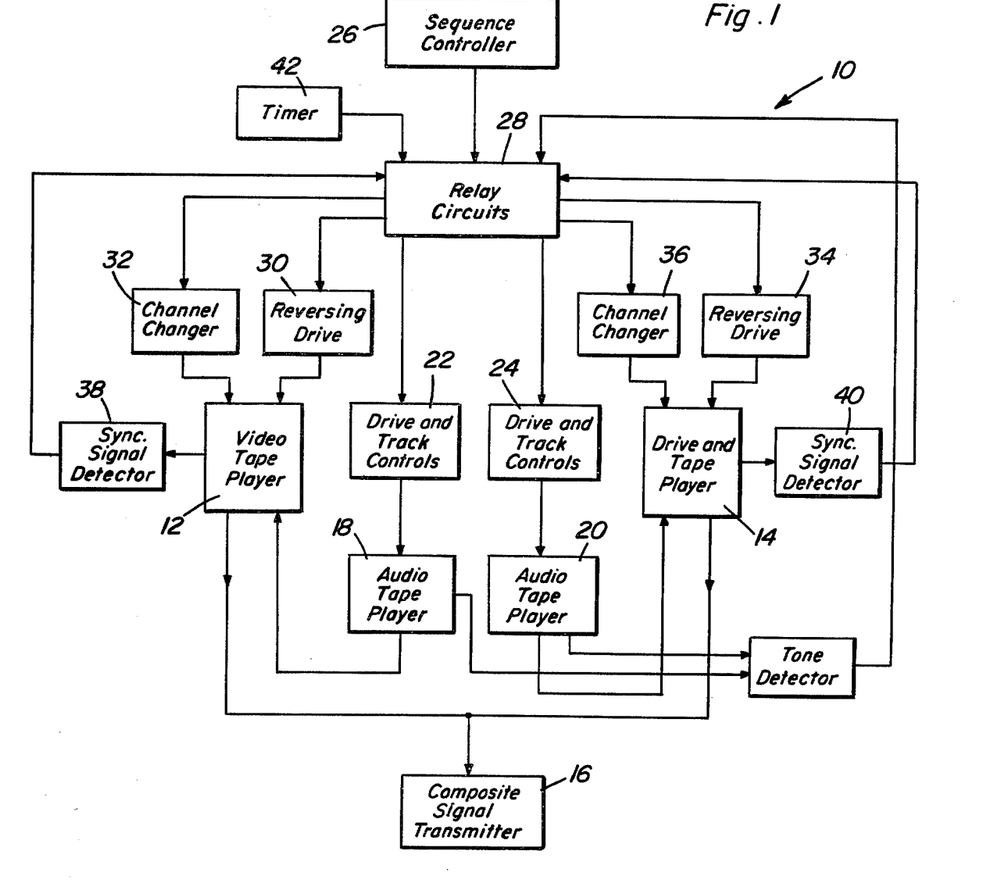
FIG. 1 is a schematic block diagram illustrating the system of the present invention.

Referring now to the drawings in detail, FIG. 1 schematically illustrates the system of the present invention generally referred to by reference numeral 10. Program schedule information is derived from a video record player generally referred to by reference numeral 12 whereas commercial advertising material is derived from a second video record player 14. These video record players 12 and 14 produce composite video and audio outputs that are fed to a signal transmitter 16 through which video and audio signals are transmitted along a selected television channel. The video signal outputs from the video record players are combined with audio signals obtained from a pair of audio tape players 18 and 20. The audio tape players are of the eight track type and are provided with drive and track controls 22 and 24 through which synchronized operation is effected under control of a sequence controller 26 through a relay circuit component 28. The relay circuit component also controls operation of video record player 12 through a reversing drive component 30 and a frame channel changer 32. Operation of the video record player 14 in a somewhat different mode is also controlled by a reversing drive component 34 and a frame channel changer 36. Operation of the video record players 12 and 14 are synchronized through sync signals recorded on the film, such sync signals being picked up by sync signal detectors 38 and 40 and fed to the relay circuit component 28. The information displayed by the system is periodically updated under control of a timer component 42 also connected to the relay circuit component.

Figure 2:
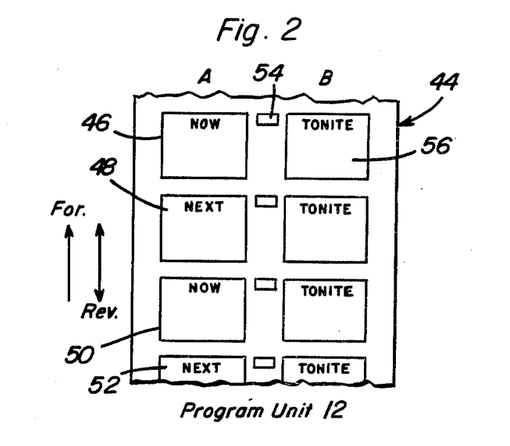
FIG. 2 is a plan view of a portion of the film associated with one of the video record players through which program schedule information is produced.

As shown in FIG. 2, the video record player 12 from which the program schedule information is derived, has an optical record in the form of film 44 on which two frame channels are recorded as denoted by A and B in FIG. 2. On the left hand channel A as viewed in FIG. 2, frame 46 will have program schedule information recorded thereon labelled "Now", corresponding to a single half hour period of time. The following frame 48 labelled "Next" will have program schedule information for the next half hour period recorded thereon. The same program schedule information recorded on frame 48 will also be recorded on frame 50 except that frame 50 is labelled "Now". During any half hour period, the film 44 is advanced in forward and reverse directions by a distance of one frame in order to alternately display the information recorded on film frames 46 and 48 for 20 second intervals each. At the end of each half hour period, the film 44 is advanced in a forward direction without reversal in order to begin an updated operational phase during which the information on the next two frames 50 and 52 are alternately displayed. Movement of the film in opposite directions, one frame at a time during each cycle is controlled by sync signals derived from the recorded cue signals 54 located between the channel frames A and B on the film 44 as shown in FIG. 2. The film frames 56 of the right channel B as viewed in FIG. 2, will also be displayed during 20 second intervals between the alternate display of the information on film frames 46 and 48 or 50 and 52. Accordingly, other program scheduling information labelled "TONITE" will be recorded on film frames 56, each succeeding pair of frames 56 containing information that is updated.

Figure 3:
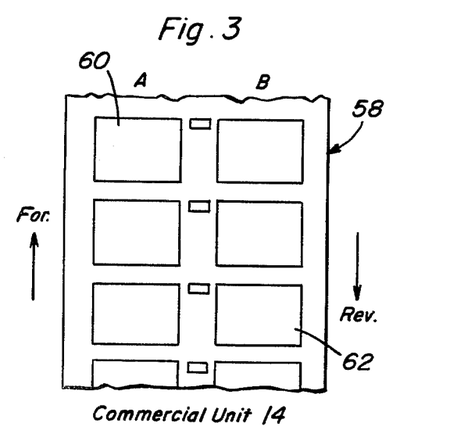
FIG. 3 is a partial plan view of a film associated with the other of the video record players through which commercial advertising displays are produced.

A similar film 58 is associated with the video record player 14 as shown in FIG. 3. The film 58 is advanced in a forward direction only in order to successively display the commercial advertising information recorded on each film frame 60 of one channel A for example, the commercial advertising material being displayed during 15 second intervals spacing the display of information on the frames of the film 44. After all of the material recorded on frames 60 are exhausted, the direction of movement of the film 58 is reversed in order to then successively display commercial advertising information recorded on the film frames 62. In one particular example, each frame channel A and B of the film 58 contains 70 different commercials.

Figure 4:
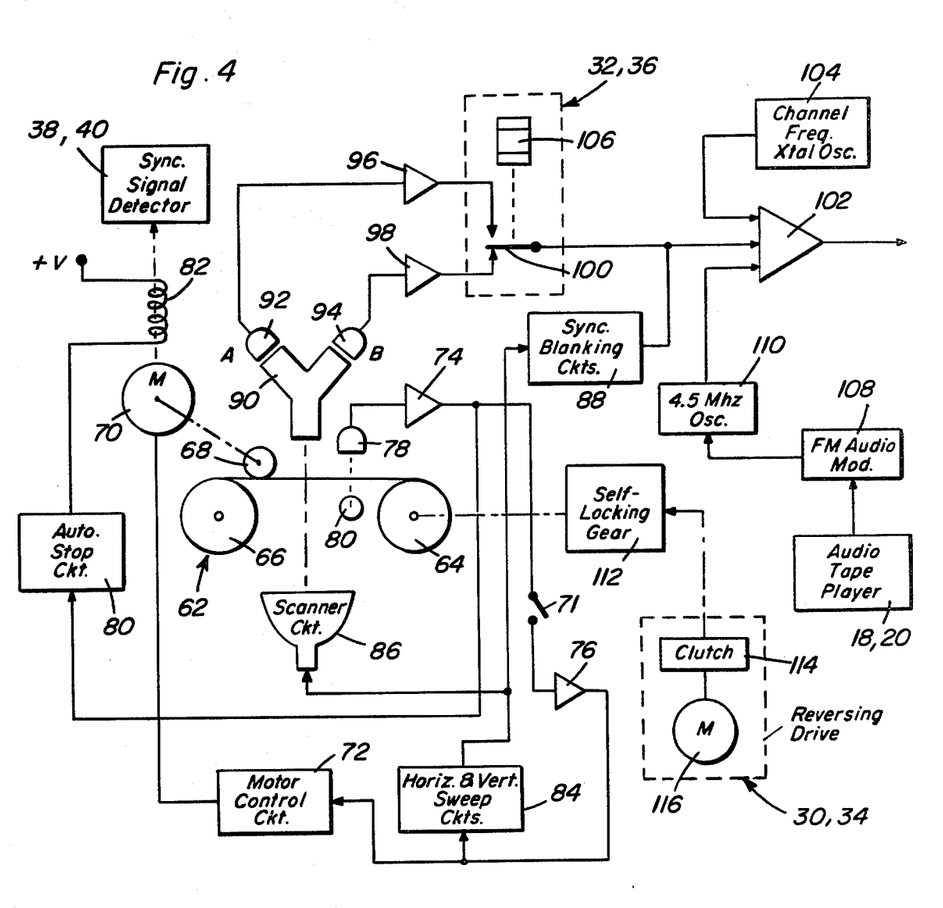
FIG. 4 is a schematic circuit diagram of a video record player modified in accordance with the present invention.

FIG. 4 schematically illustrates a modified commercial video record player utilized in the system of the present invention according to one embodiment. The commercial video record player 12 or 14 utilized may be of a type manufactured by Motorola, Inc., marketed as a "Teleplayer Unit", Model Nos. CR100 GW and CR102HW, Chassis 3TS-471. The foregoing type of video record player includes a film transport mechanism 62 through which the film 44 or 58 is advanced in a forward direction from a supply reel 64 to a take-up reel 66. The film is continuously driven by a drive capstan 68 connected to a drive motor 70. The motor 70 is ordinarily operated at a regulated speed under control of a motor control circuit 72 receiving a synchronizing signal through amplifiers 74 and 76 from a photomultiplier tube 78. The photomultiplier tube produces its synchronizing signal by light originating from lamp 80 projected through the cue signal recordings 54 on the film 44 as aforementioned in connection with FIG. 2. The synchronizing signal is also fed through an automatic stop circuit 79 to a stop coil 82 through which operation of the motor is interrupted when the film is exhausted. For purposes of this invention, the motor 70 may be operated through switch 71 to manually advance the film in a non-automatic mode when desired. The sync signal supplied to the motor control circuit 72 is also supplied to the horizontal and vertical sweep circuits 84 from which a scanner 86 and a sync and blanking circuit 88 are controlled. The scanner 86 constitutes the source of source of light that is transmitted through the frames of the film and conducted by the optic fiber arrangement 90 to a pair of photomultiplier tubes 92 and 94 arranged to convert the optical information respectively recorded on the frames of channels A and B into electrical video signals. Accordingly, two video signal paths or channels simultaneously transmit the information from the frames of channels A and B to video amplifiers 96 and 98. The output of the video amplifiers 96 and 98 are alternately fed through a channel chaning relay switch 100 to an output amplifier 102 to which a carrier signal is fed from a channel frequency crystal oscillator 104. Also fed to a third input of the amplifier 102 is an audio signal derived from an audio tape player 18 or 20. The audio output of the audio tape player is converted into an FM audio modulating signal by the modulator 108 that controls the oscillator 104 and the amplifier 102. Accordingly, a composite video and audio output signal form the amplifier 102 is fed to the transmitter 16 as depicted in FIG. 1 when the video record player is functioning. The specific details of the video record player components hereinbefore and hereinafter referred to do not form part of the present invention but as part of a commercially marketed product are well known to those skilled in the art.

The video record player as depicted in FIG. 4 is modified in accordance with the present invention for operation in the system by automatically effecting changes between channels A and B through the channel changer 32 or 36 which includes a relay coil 106 displacing the channel changing relay switch 100 between its two operative positions. The sync signal applied to the stop solenoid 82 on the other hand is detected by sync signal detector 38 or 40 by means of a switch actuator connected to the solenoid armature for example. The drive motor 70 is arranged to be operated in a continuous play mode with the film held stationary by a self-locking gear 112 connected to the supply reel 64. The reversing drive component 30 or 34 is operative through the self-locking gear 112 to effect movement of the film one frame at a time in opposite directions by engagement of a clutch 114 and energization of a reversible motor 116 of the reversing drive component.

The audio tape player 18 and 20 is connected into the system through the FM audio modulator 108.

Figure 5:
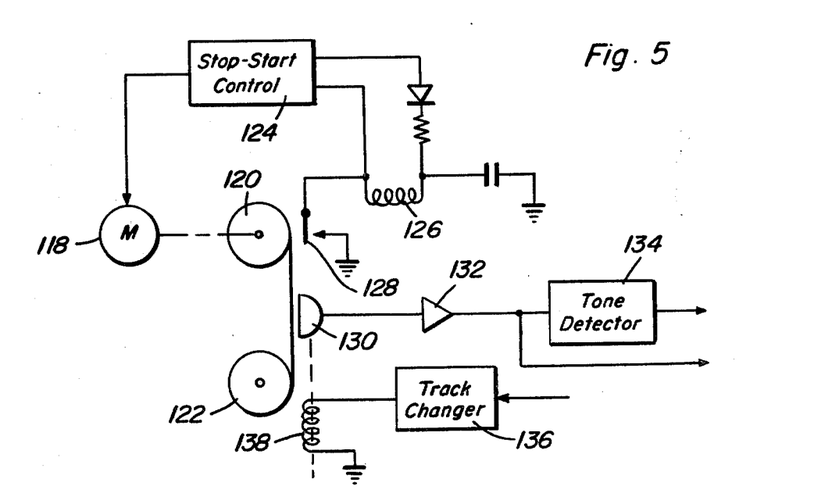
FIG. 5 is a schematic circuit diagram of an audio tape player modified in accordance with the present invention.

As hereinbefore indicated, each of the audio tape players is of a commercially available type diagramatically shown in FIG. 5. The audio tape player includes a tape transport motor 118 adapted to drive the tape take-up reel 120 for advancement of the audio tape from the supply reel 122. Operation of the motor is controlled by a stop-start control component 124 to which the start solenoid 126 is connected as well as the stop sensor 128. The tape transducer head 130 feeds its output through amplifier 132 to a tone detector 134 in order to synchronize operation of the audio tape player in the system of the present invention. A track changer component 136 also associated with the track changing solenoid 138 of the audio tape player effects a change in the recorded information in a synchronized and timely fashion as will be explained hereafter.

The foregoing chart of Table I summarizes the operational sequence associated with the system of the present invention.

the program schedule information channel will alternately view "NOW" schedules for programs in progress and "NEXT" schedules of programs for the next one-half hour period. Each half hour, these schedules will be updated or revised time-wise. Further, between each alternate display of the "Now" and "Next" schedules, a "Tonite" schedule will be shown, the "Tonite" schedule also being updated each half hour. Between the foregoing 20 second intervals during which the program schedules are shown, 15 second commercial displays are shown. Corresponding audio information is produced by the audio tape players 18 and 20 accompanying the various video displays.

Figure 6A:
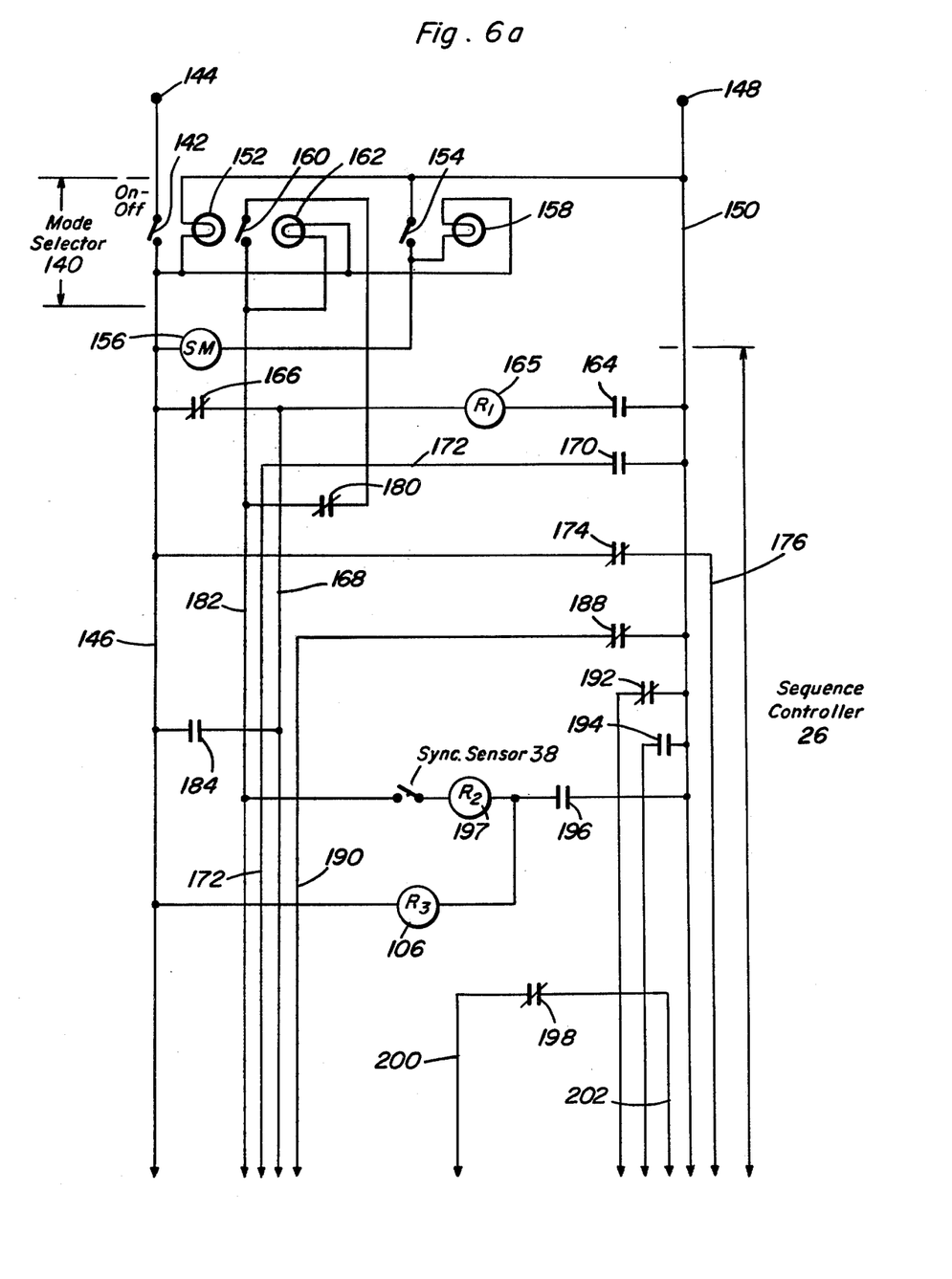
FIGS. 6A, 6B and 6C form an electrical circuit diagram representing one control system embodiment of the invention.
Figure 6B:
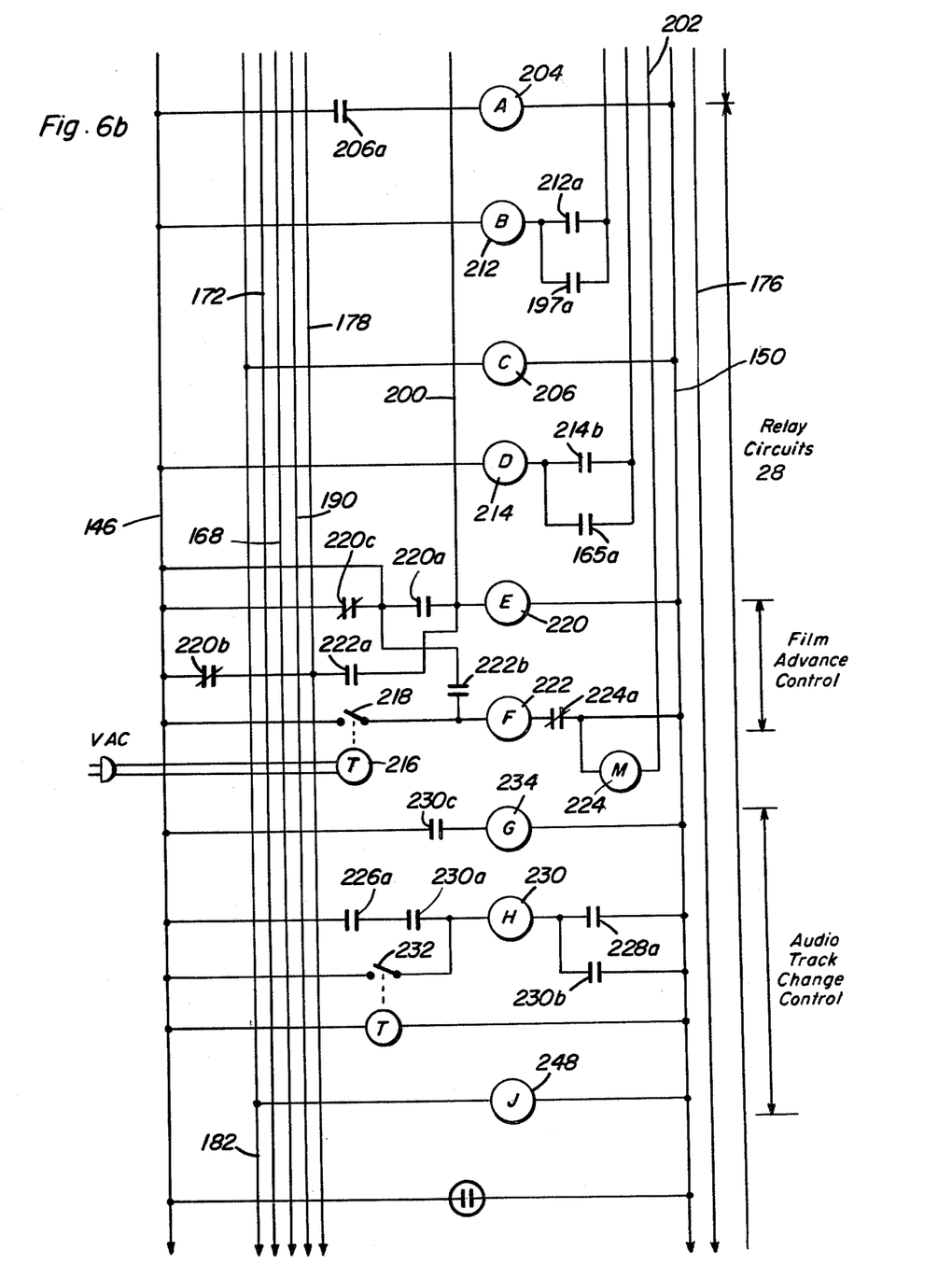
Figure 6C:
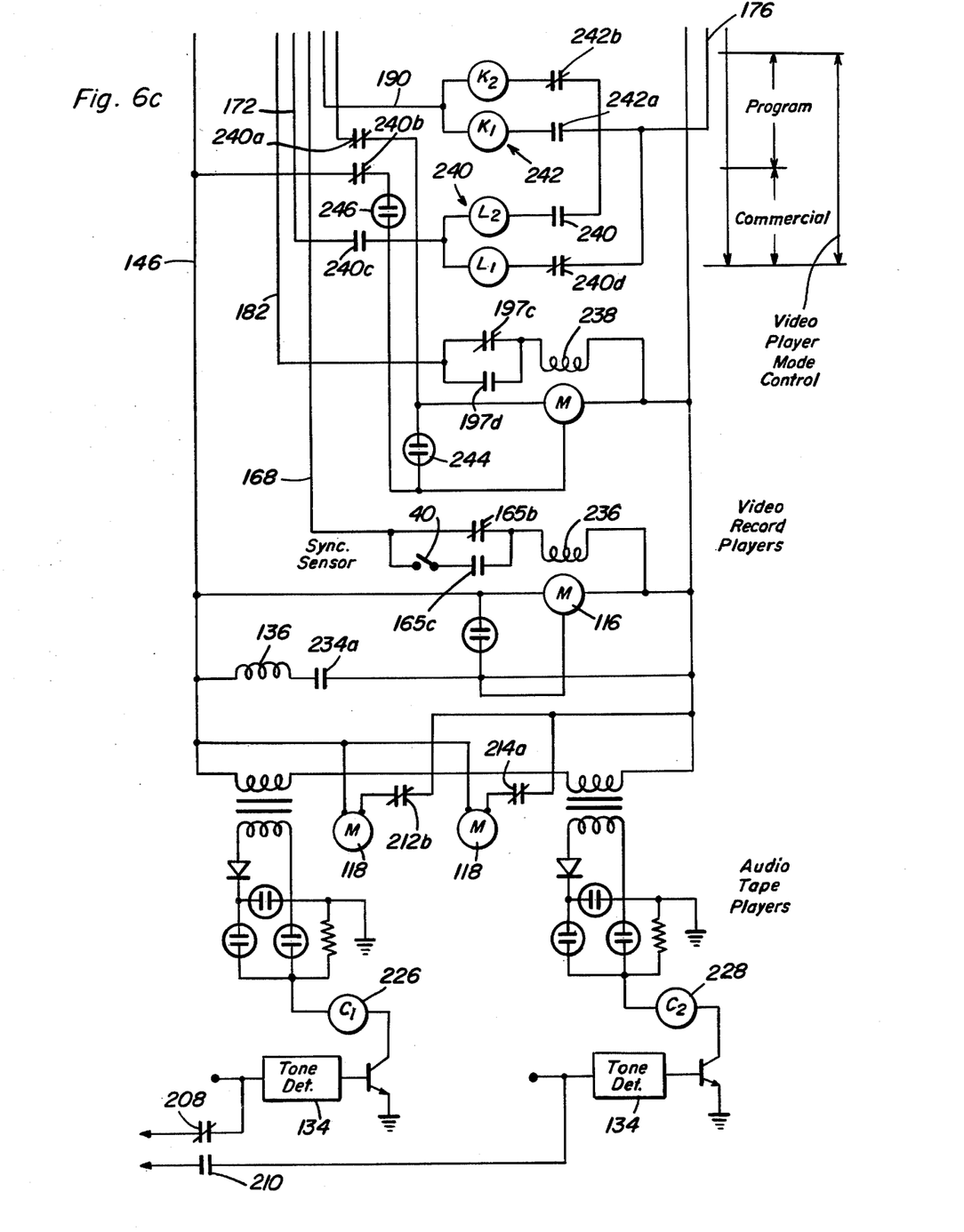

FIGS. 6A, 6B and 6C form a circuit diagram corresponding to the control system schematically depicted in FIG. 1, constituting one embodiment of the present invention. A mode selector control panel 140 as shown in FIG. 6A includes an on-off switch 142 which connects power terminal 144 to powerline 146. The other power terminal 148 is connected to power line 150. Accordingly upon closing of switch 142, an AC voltage

TABLE I

| SEQUENCE INTERVAL NO. | VIDEO 12 PROGRAM CHANNEL A | | PLAYER COMMERCIAL CHANNEL A | | AUDIO 14 PROGRAM | PLAYER 20 COMMERCIAL | DISPLAY FRAME | | | | TIME | |
|---|---|---|---|---|---|---|---|---|---|---|---|---|
| | | B | | B | | | 36 NOW | 56 TO-NIGHT | 50 NEXT | 60 COMM. | DURATON SEC. | ACCUM. SEC. |
| 1 | X | | | | X | | X | | | | 20 | 0 |
| 2 | | X | | | X | | | X | | | 20 | 20 |
| 3 | | | X | | | X | | | | X | 15 | 45 |
| 4 | X | | | | X | | | | X | | 20 | 60 |
| 5 | | X | | | X | | | X | | | 20 | 80 |
| 6 | | | X | | | X | | | | X | 15 | 95 |
| 19 | | | X | | | X | | | | X | 15 | 1805 |
| 106 | | | | X | | X | | | | X | 15 | |

For example, the information recorded on film frame 46 of channel A as shown in FIG. 2 will be displayed for 20 seconds during a first interval. Program material will be simultaneously fed from the audio tape player 18. During the next 20 second interval program information recorded on the frame 56 of channel B will be displayed without movement of the film but by displacement of the channel changing switch 100. At the end of the second interval, movement of the film 44 in a forward direction by the video record player 12 is initiated. Such movement is effected in one direction during a third interval of 15 seconds during which the output of the other video record player 14 is transmitted to display information on one of the film frames 60. At the end of this third interval, the output of the video record player 14 is switched off and the video record player 12 switched on to display information from the next frame 48 of channel A during a fourth interval. After the film frame 48 is displayed, another film frame 56 on B channel is displayed for 20 seconds during a fifth interval followed by display of a film frame 60 from the commercial video record player 14 for a period of 15 seconds during a sixth interval to complete one half of a cycle. The foregoing half cycle is repeated except that the film 44 moves in a reverse direction. This sequence or cycle is repeated until the one-half hour program period has elapsed at which time the film 44 is uni-directionally advanced as shown by sequence number 19 on the chart. At sequence interval No. 106, when the film 58 has been advanced 70 times, a channel change occurs in the video record player 14 as shown in the chart. Thus, the television viewer when turning to is applied through power terminals 144 and 148 across power lines 146 and 150. Indicator lamp 152 is then illuminated. Upon closure of switch 154, a switch actuating motor 156 is connected across the power lines to begin operation of the sequence controller 26 as signified by indicator lamp 158. In order to cause advancement of the film 44 of the video record player 12 out of sequence for loading purposes, switch 160 is closed to complete an energizing circuit in series with its indicator lamp 162.

Upon energization of the switch actuating motor 156 operative at a preset speed of 1 RPM for example, a series of ten switches associated with the sequence controller 26 are actuated in a predetermined timed sequence to produce the functions hereinbefore described. As shown in FIG. 6A, these switches include normally open switch 164 and normally closed switch 166 connected in series across the power lines with a relay coil 165 to synchronize operation of the video record player 14 through conductor 168 connected between the switches. The operating mode of the video record players is changed by normally open switch 170 through conductor 172, the change being timed through normally closed switch 174 connected to the relay circuit through conductor 176. Normally closed switch 180 is connected between switch 160 and conductor 182 to initiate operation of the video record player 12 while switch 184 connects power line 146 to conductor 168 for operation of the video record player 12. Power line 150 is connected by normally closed switch 188 to conductor 190 for relay operational purposes while switches 192 and 194 alternately connect power line 150 to the relay circuits for synchronizing film movement. A normally open switch 196 controls energization of video channel changing relay coil 106 for the video record player 12 and through sync detector switch 38 energizes relay coil 197 to synchronize film movement. Relay control is exercised by normally closed switch 198 connected to the relay circuits through conductors 200 and 202.

In the relay circuit component 28, relay coil 204 as shown in FIG. B is connected across the power lines in series with relay switch 206a to alternately switch the audio output between tape players 18 and 20 through relay switches 208 and 210 shown in FIG. 6C. The relay coil 212 is connected across the power lines in series with relay switch 197a and sequence control switch 192 to synchronize film movement under control of relay coil 197. Relay holding switch 212a is connected in parallel with relay switch 197a. Energization of relay coil 212 closes relay switch 212a to hold it energized and opens its relay switch 212b to deenergize the tape transport motor 118 of audio tape player 18 as shown in FIG. 6C. The tape transport motor 118 of audio tape player 20 on the other hand is deenergized by opening of relay switch 214a when relay coil 214 is energized. Relay coil 214 is energized upon energization of relay coil 165 and closing of its relay switch 165a when the sequence control switch 194 is closed upon opening of sequence control switch 192. The relay coil 214 is held energized by closing of its relay holding switch 214b.

Each half hour, timer 216 which is independently powered, closes its timer switch 218 to energize relay coil 222 for film advancement purposes. When energized, relay coil 222 closes relay switch 222a to energize relay coil 220. Relay coil 220 is held energized through relay switch 220a upon opening of its relay switches 220b and 222c. Relay coil 222 is prevented from remaining energized by relay coil 224 connected across the power lines in series with sequence control switch 198 and relay switch 220a. When energized, relay coil 224 opens its relay switch 224a to open the energizing circuit for relay coil 220.

Track changing operations in the audio tape players 18 and 20 is controlled by signals fed from the tone detectors 134 to pulse relay coils 226 and 228 as shown in FIG. 6C. Relay coil 228 when energized closes its relay switch 228a as shown in FIG. 6B so as to condition relay coil 230 for energization upon closing of timer switch 232 every 24 hours. When energized, relay coil 230 closes its relay holding switches 230a and 230b to maintain it energized through relay switch 226a. Also, relay switch 230c is closed to energize relay coil 234.

Relay coil 165 when energized as aforementioned under control of sequence control switches 164 and 166 is operative through its relay switches 165b, 165c and 165d as shown FIG. 6C to control energization of clutch coil 236 of clutch 114 in the video record player 14 through which reversing drive motor 116 (20) drives by a limited amount determined by the sync sensor switch 40. The relay switches 197c and 197d on the other hand control energization of clutch coil 238 in the video record player 12 and are actuated by relay coil 197 connected in series with the sync sensor switch 38 as shown in FIG. 6A to control drive by reversing motor 116 (18). The energizing circuits for the clutch coils 236 and 238 are established through conductors 168 and 182 for effecting movement of the film. Reversible drive control for the motor 116 of video record player 12 is effected through relay switches 240a, 240b and 240c associated with latching relay 240, the coils of which are interconnected with the coils of latching relay 242 through relay switches 240d, 240e, 242a and 242b. Conductor 176 also connects relay switches 240d and 242a to sequence control switch 174 aforementioned.

With continued reference to FIGS. 6A, 6B and 6C, an operational cycle is begun by closing of sequence control switch 166 to complete an energizing circuit through clutch coil 236 by means of conductor 168 and relay switch 165b between the power lines 146 and 150 to advance film 58 of video record player 14. Sequence control switch 164 also closes to energize relay coil 165 after movement of the film has begun to complete the circuit through relay switch 165c in series with sync sensor switch 40 so as to insure movement of the film by a single frame distance. This movement of film 58 occur while the video record player 12 is displaying a program schedule labeled "NOW" from channel A during a 20 second display interval identified as interval No. 1 in the chart of Table I. During the foregoing display interval sequence control switch 192 is also opened to deenergize relay coil 212 causing relay switch 212b to close to energize the tape transport motor 118 of audio tape player 18. Audio program information is accordingly reproduced. At the same time, sequence control switch 184 opens to disconnect power line 146 from conductor 182 resulting in deenergization of relay coil 206. When deenergized, relay coil 206 opens relay switch 206a to deenergize relay coil 204. When deenergized, relay coil 204 opens relay switch 210 to disconnect the output from audio tape player 20 and closes relay switch 208 to connect the output to audio tape player 18 from which the audio program material is reproduced.

At the end of the foregoing display interval No. 1, sequence control switch 196 closes to energize relay 106 switching the output of video record player 12 from the A channel to the B channel. Program schedule information labeled "Tonite" is accordingly displayed during the next display interval No. 2 of 20 seconds duration. This interval is terminated by momentary closing of sequence control switch 170 connecting power line 150 through conductor 172 to the coils of latching relay 240 connected by relay switch 240d and conductor 176 to power line 146. When actuated, relay 240 is latched to open relay switch 240a and close relay switch 240c to reverse motor 116. Motor 116 drives the film 44 in a reverse direction under control of clutch coil 238 deenergized after advancing the film one frame by closing of sync sensor switch 38 as aforementioned to energize the relay coil 197 and actuate relay switches 197b and 197c.

During the foregoing reverse advancement of film 44 at the end of display interval No. 2, sequence switch 184 closes for a period of 15 seconds connecting power line 146 to conductor 168 to supply operating current to clutch coil 236 through relay switch 165b or 165c. Sequence switch 180 closes to connect relay coils 197 and 206 to line 146 through conductor 182. Relay coil 206 when so energized switches the audio output from audio tape player 18 to player 20 through relay 204 as aforementioned by closing relay switch 206a. Also, relay coil 248 shown in FIG. 6B is energized to switch the output from video record player 12 to 14 for display of the commercial material on film 58 during the 15 second interval No. 3.

At the end of the latter 15 second interval, sequence switch 194 closes to permit relay coil 214 to be energized through relay switch 165a and it remains energized through its relay holding switch 214b. Relay switch 214a is thereby opened to stop the audio tape player 20. The sequence is then repeated except that program schedule information on channel B labeled "NEXT" is displayed and motor 116 of the video record player 12 is operated in a forward drive mode by closing of relay switch 240a and opening of relay switch 240c. One cycle is thereby completed and this cycle is repeated without change until a one half hour program period has elapsed.

At the end of the half hour period, timer 216 closes switch 218 to energize relay coil 222. Relay switch 222a is thereby closed to activate relay coil 220 which opens relay switch 220b to disconnect power line 146 from conductor 178 and thereby prevent supply of operating current to motor 116 upon closing of sequence switch 174 for operation in the reverse drive mode. Relay coils 220 and 222 remain energized through relay switches 222b and 220a and are released by momentary closing of sequence control switch 198 which activates relay coil 224 to open the circuit of relay coil 222 through relay switch 224a. Thus, there is no reverse movement of the film 44 so that it is uni-directionally advanced at the end of each half hour period. Operation of the system then proceeds as before.

Program information may be changed each 24 hour period by closing of timer switch 232 (FIG. 6B) to activate relay coil 230 when tones from audio tape players 14 and 20 are detected to energize relay coils 226 and 228, closing relay switches 228a and 226a. Relay switch 230a and 230b are closed to hold relay coil 230 energized while relay switch 230c is closed to energized relay coil 234. Relay coil 234 when energized closes relay switch 234a to effect a track changing operation through track changing solenoid 136. Appropriate control signals on one of the audio tape tracks of each player 18 and 20 are therefore operative through the tone detectors 134 and relays 226 and 228 to effect synchronized track changing operations through solenoid 136.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in a television distribution zone wherein a television receiver may be selectively tuned to a plurality of channels over which television programs are transmitted, a system for displaying program schedules comprising a transmitter transmitting over one of said channels, a video record player device having a transport mechanism, optical record means associated with said player device for storing program schedule displays, means for transmitting composite video signals corresponding to said schedule displays to the transmitter from the player device, sequence control means connected to the transport mechanism for synchronized movement of the optical record means in opposite directions to cyclically transmit said composite video signals, and timer means connected to the sequence control means for periodically effecting a change in the composite video signals transmitted, whereby timely program schedule information transmitted over said one of the channels may be viewed on said television receiver.

2. For use in a television distribution zone wherein a television receiver may be selectively tuned to a plurality of channels over which television programs are transmitted, a system for displaying program schedules, comprising a transmitter transmitting over one of said channels, video signal player means connected to the transmitter for feeding video signals thereto, optical record means associated with said video signal player means for storing program schedule displays, means for transmitting composite video signals corresponding to said schedule displays information to the transmitter from the video player means, sequence control means connected to the player means for synchronized movement of the optical record means, timer means connected to the sequence control means for periodically effecting a change in the composite video signals transmitted to the transmitter whereby timely program schedule information may be viewed on said television receiver, said optical record means including a program schedule film having frames thereon from which said program schedule displays are derived, and drive control means connected to said player means for displaying the film one frame at a time in response to signals from the sequence control means.

3. The combination of claim 2 wherein the sequence control means includes means for intermittently effecting displacement of the film in opposite directions during a program period of predetermined duration and alternate display of at least two program schedules, sensor means for detecting registration of the film frames at operative positions at which said video signals are generated, and means connecting the sensor means to the sequence control means for stopping displacement of the film in response to registration of the film frames at said operative positions.

4. The combination of claim 3 wherein the optical record means includes additional film from which advertising material is transmitted between said alternate transmission of the program schedule displays.

5. The combination of claim 4 including audio player means for generating an audio message signal during transmission of video signals corresponding to said advertising material.

6. The combination of claim 5 including means connected by the timer means to the sequence control means for uni-directionally advancing the program schedule film upon completion of the program period.

7. The combination of claim 6 including audio player means connected to the sequence control means for generating an audio message signal during transmission of the advertising displays.

8. In combination with a video record player having a film transport mechanism through which film may be selectively displaced to frame alignment positions at which video signals are produced by a scanner system operated in synchronized relation to movement of the film, sequence control means for regulating movement of the film including drive control means connected to the transport mechanism for effecting displacement of the film alternately in opposite directions to said frame alignment positions, and timer means connected to the transport mechanism for periodically effecting unidirectional advancement of the film in one direction from one of said frame alignment positions, whereby the video signals produced correspond to alternate display of information on two adjacent film frames periodically changed to update the information.

9. The combination of claim 8 wherein said video record player includes at least two operating channels through which the video signals are reproduced from different frames on the film, and means connected to the sequence control means for switching channels while said film is stationary at each of said frame alignment positions.

10. The combination of claim 8 wherein said transport mechanism includes a drive motor for advancing the film in said one direction and a self-locking gear operatively connected to the drive control means.

11. The combination of claim 10 wherein said drive control means includes a reversing motor.

12. A system for distributing information, comprising a transmitter, a record medium on which information is stored, a scanning device having a transport mechanism carrying said record medium, means for transmitting to the transmitter signals from the scanning device derived by scanning of the information stored on the record medium, sequence control means connected to the transport mechanism for movement of the record medium in opposite directions to repeat the signals transmitted, and timer means connected to the sequence control means for periodically effecting a change in the signals transmitted whereby timely information is distributed by the transmitter.

* * * * *